United States Patent
Newstadt

(10) Patent No.: US 9,137,228 B1
(45) Date of Patent: Sep. 15, 2015

(54) AUGMENTING SERVICE PROVIDER AND THIRD PARTY AUTHENTICATION

(71) Applicant: Symantec Corporation, Mountain View, CA (US)

(72) Inventor: Keith Newstadt, West Newton, MA (US)

(73) Assignee: Symantec Corporation, Mountain View, CA (US)

( * ) Notice: Subject to any disclaimer, the term of this patent is extended or adjusted under 35 U.S.C. 154(b) by 77 days.

(21) Appl. No.: 13/930,605

(22) Filed: Jun. 28, 2013

(51) Int. Cl.
*H04L 29/06* (2006.01)

(52) U.S. Cl.
CPC ........................... *H04L 63/08* (2013.01)

(58) Field of Classification Search
CPC .................................................. H04L 63/0884
USPC ...................... 726/3, 4, 5; 713/182
See application file for complete search history.

(56) References Cited

U.S. PATENT DOCUMENTS

| | | | | |
|---|---|---|---|---|
| 2007/0136573 | A1* | 6/2007 | Steinberg | 713/155 |
| 2007/0234408 | A1* | 10/2007 | Burch et al. | 726/6 |
| 2008/0235375 | A1* | 9/2008 | Reynolds et al. | 709/225 |
| 2014/0245389 | A1* | 8/2014 | Oberheide et al. | 726/3 |

* cited by examiner

*Primary Examiner* — Brian Shaw
(74) *Attorney, Agent, or Firm* — Brill Law Office; Jeffrey Brill

(57) ABSTRACT

An SP's default user authentication is automatically augmented. An access request from a user is redirected from the SP to an authentication augmentation system. The SP also sends an augmentation request. The augmentation system redirects the access request to an IdP, and receives back an authenticated user identity. The default authentication is automatically augmented with additional techniques such as identity proofing and/or multifactor authentication, without the SP or the IdP modifying their code to implement or integrate the augmented authentication. Responsive to successfully authenticating the user according to the additional techniques, an augmented authenticated user identity is redirected to the SP. The augmentation system can use an identity management protocol such as SAML to communicate with the SP and IdP. Authentication performed by a third party and extended to the SP can be augmented, in which case a session id can be used to access third party services.

17 Claims, 5 Drawing Sheets

AUGMENTING SERVICE PROVIDER AND THIRD PARTY AUTHENTICATION

TECHNICAL FIELD

This disclosure pertains generally to online authentication of computer users, and more specifically to augmenting online service provider and third party performed user authentication, by automatically integrating strong techniques such as multifactor authentication and identity proofing.

BACKGROUND

Authenticating users before allowing access to websites is crucial. Online services such as banking, bill payment, social networking and e-commerce utilize ever increasing amounts of personal and financial user data online. Identity thieves and other malicious parties use a wide variety of techniques to attempt to gain unauthorized access to the accounts of innocent parties to commit financial fraud, obtain personal information and otherwise harm the interests of legitimate account owners and service providers. Properly authenticating users attempting to access online services (e.g., websites) protects against such fraud, whereas insufficient authentication creates vulnerabilities.

Password authentication, in which the only authentication factor a user needs to provide is a password, is relatively weak. The types of passwords commonly utilized are fairly easy to crack, whereas strong passwords are difficult for users to remember and hence are rarely used at all, or else are written down in accessible locations. These problems are compounded by the number of separate password authenticated accounts most users need to maintain. Despite this, because password authentication is easy for service providers to implement, it is the current de facto authentication standard on the web. Some service providers attempt to strengthen their user authentication by supplementing the password requirement with challenge questions (e.g., mother's maiden name, zip code, city of birth, etc.), but this adds limited protection, as the answers to such questions can be guessed or learned by fraudulent parties relatively easily.

Multifactor authentication is more secure than password based authentication. In multifactor authentication, the user must present multiple authentication factors of different types to access a service. For example, in two-factor authentication (TFA), a user must provide two or more of three factors: something the user knows (e.g., a password or PIN), something the user has (e.g., a hardware token generated random number, a onetime pad, a magnetic stripe card) and something the user is (e.g., a fingerprint or retina scan). Multifactor authentication is much harder to crack than password only authentication, and is thus critical in providing secure access to websites. Identity proofing, in which users are required to prove that they are who they claim to be before being granted initial access to a service (e.g., given an account or issued authentication credentials in the first place), is also important in this regard. However, these are difficult technologies to build and maintain, and many online service providers do not have the expertise to either build or integrate them into their websites.

It would be desirable to address these issues.

SUMMARY

A computer implemented authentication augmentation system automatically augments a service provider's authentication of a user. A request for authenticated access is made by the user to the service provider. The service provider redirects the request for authenticated access to the authentication augmentation system. The service provider further sends the authentication augmentation system a request to augment the authentication. The request to augment the service provider's authentication of the user can specifically direct the authentication augmentation system as to what additional authentication technique(s) to provide, or it can be in the form of a more general directive to augment the authentication.

The authentication augmentation system receives both requests, and redirects the request for authenticated access to an identity provider. In different embodiments, the identity provider is operated by the service provider, by a third party or even by the authentication augmentation system itself. The authentication augmentation system receives an authenticated identity for the user from the identity provider. The authenticated identity indicates that the user has been successfully authenticated by the identity provider according to the default authentication of the service provider (e.g., single factor password based authentication).

The authentication augmentation system automatically augments the default authentication of the service provider with one more additional authentication techniques, responsive to augmented authentication request. This is done without the service provider or the identity provider modifying its code to implement or integrate the additional authentication technique(s). In some embodiments, automatically augmenting the default authentication of the service provider can take the form of providing identity proofing of the user, by the authentication augmentation system. In one embodiment, a communication channel other than the current online communication session is used in order to prove the user's identity. In another embodiment, a question is dynamically generated on the fly for the user to answer, and thereby prove his/her identity. In one embodiment, identity proofing is only employed when the user's identity has not been previously proven to the authentication augmentation system. In addition to (or instead of) identity proofing, automatically augmenting the default authentication of the service provider can comprise providing multifactor authentication, for example by authenticating the user based on at least a second factor in addition to a password. Such a second factor can be, for example, a hardware token generated passcode or a biometric factor. In some embodiments, multiple factors in addition to the password are used to authenticate the user.

Responsive to successfully authenticating the user according to the additional authentication technique(s), the authentication augmentation system redirects an augmented authenticated identity for the user to the service provider. The augmented authenticated identity contains the authenticated identity for the user indicating that the user has been successfully authenticated by the identity provider according to the default authentication, and further includes an indication that the user has been successfully authenticated according to additional authentication technique(s). The authentication augmentation system can use an identity management protocol such as Security Assertion Markup Language ("SAML") to communicate with the service provider and the identity provider concerning authentication of the user.

In some embodiments, the authentication augmentation system automatically authenticates default user authentication performed by a third party that provides both services and authenticated user identities, without the service provider entering into a specific partnership with the third party. In such cases, the third party extends its authentication to the service provider. Typically, the identity management protocol utilized by the third party is used by the authentication augmentation system to communicate with the third party concerning authentication of the user. The authenticated identity for the user received by the authentication augmentation system comprises a third party session id concerning the user. The authentication augmentation system can use the received third party session id to access services provided by the third party, on behalf of the user.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
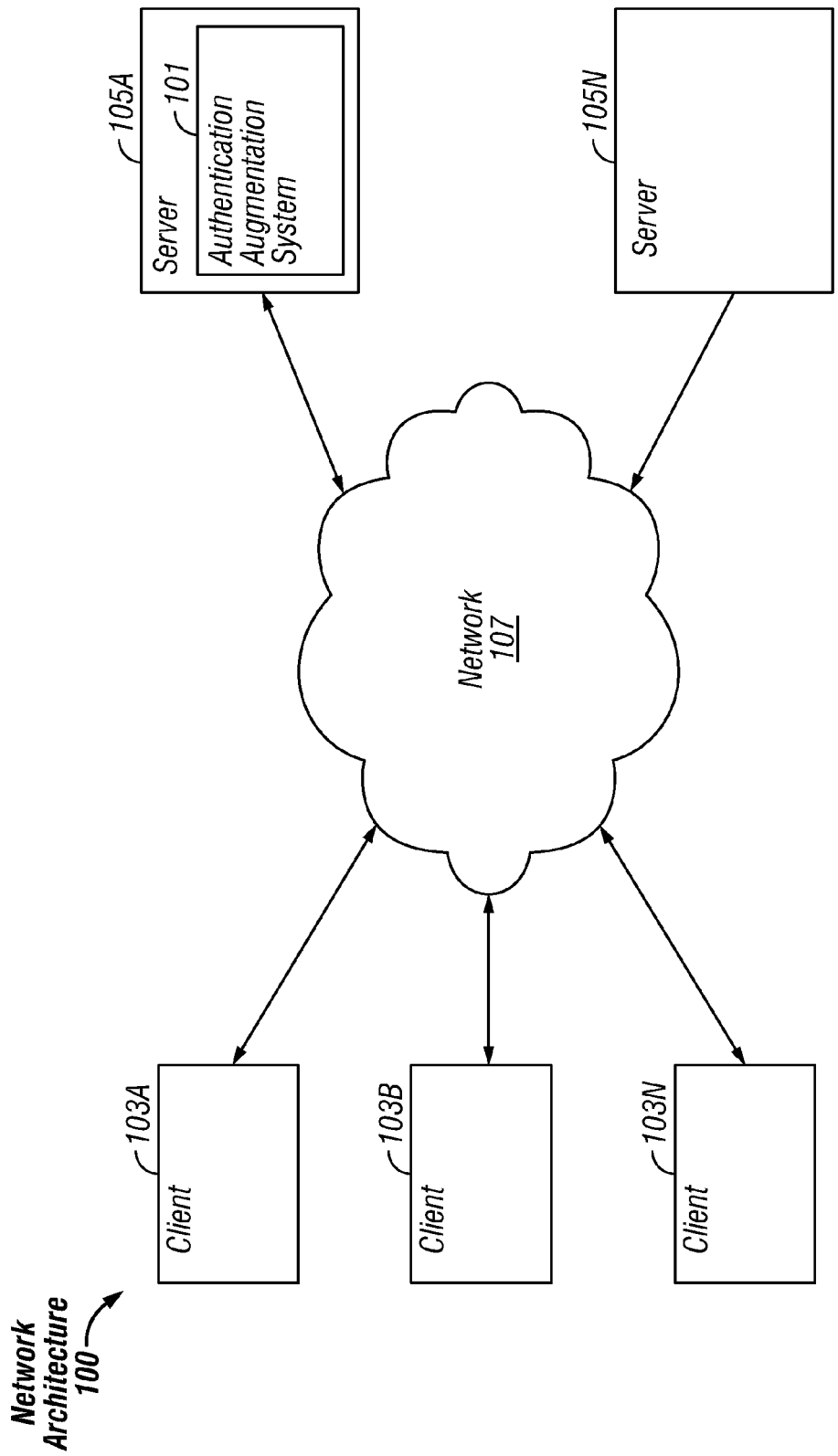
FIG. 1 is a block diagram of an exemplary network architecture in which an authentication augmentation system can be implemented, according to some embodiments.

FIG. 1 is a block diagram illustrating an exemplary network architecture 100 in which an authentication augmentation system 101 can be implemented. The illustrated network architecture 100 comprises multiple clients 103A, 103B and 103N, as well as multiple servers 105A and 105N. In FIG. 1, an authentication augmentation system 101 is illustrated as residing on server 105A. It is to be understood that this is an example only, and in various embodiments various functionalities of this system 101 can be instantiated on a client 103, a server 105, or can be distributed between multiple clients 103 and/or servers 105.

Clients 103 and servers 105 can be implemented using computer systems 210 such as the one illustrated in FIG. 2 and described below. The clients 103 and servers 105 are communicatively coupled to a network 107, for example via a network interface 248 or modem 247 as described below in conjunction with FIG. 2. Clients 103 are able to access applications and/or data on servers 105 using, for example, a web browser or other client software (not shown). Clients 103 can be in the form of desktop/laptop computers, or mobile computing devices, comprising portable computer systems capable of connecting to a network 107 and running applications. Such mobile computing devices are sometimes referred to as smartphones, although many mobile phones not so designated also have these capabilities. Tablet computers are another example of mobile computing devices.

Although FIG. 1 illustrates three clients 103 and two servers 105 as an example, in practice many more (or fewer) clients 103 and/or servers 105 can be deployed. In one embodiment, the network 107 is in the form of the Internet. Other networks 107 or network-based environments can be used in other embodiments.

Figure 2:
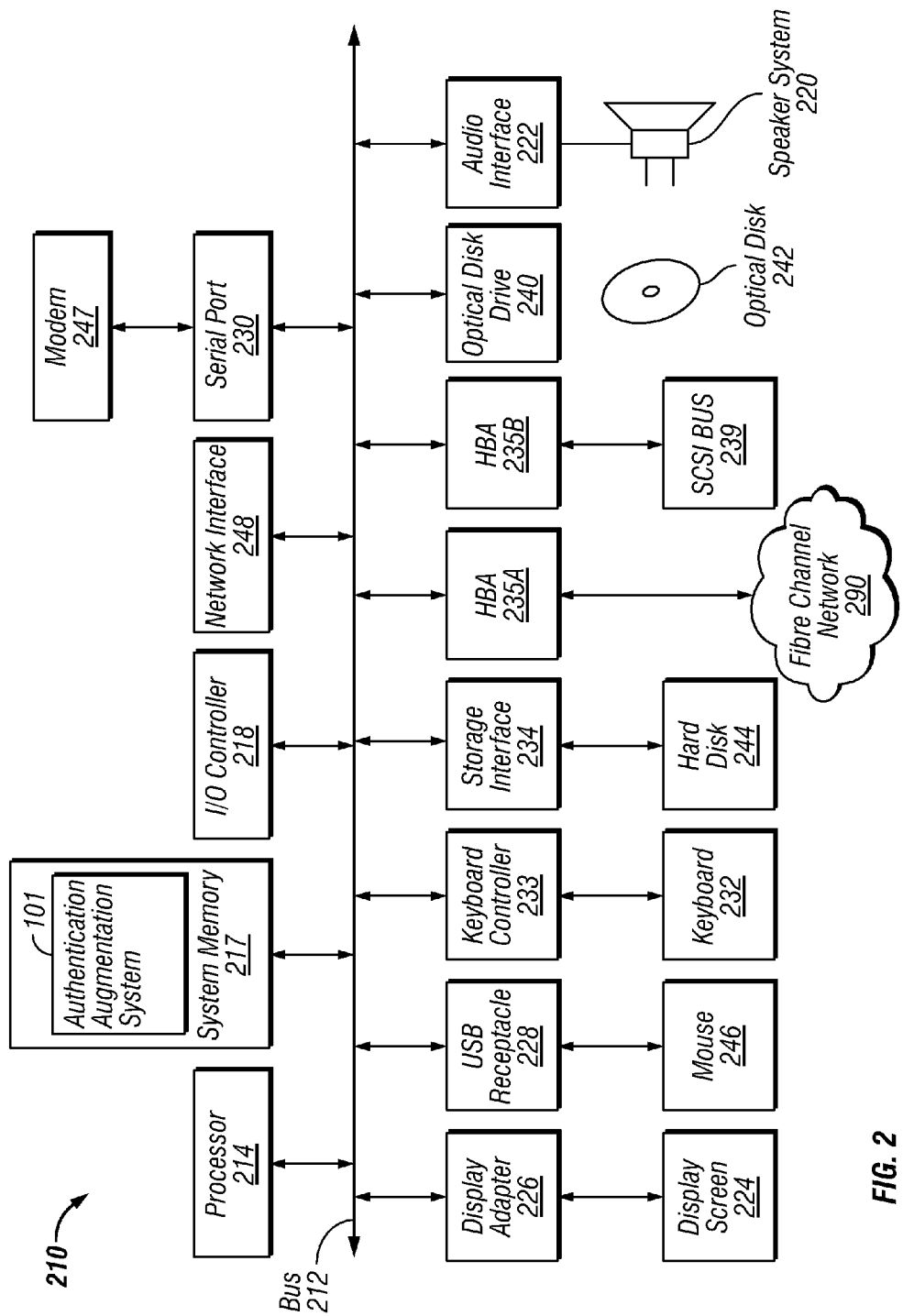
FIG. 2 is a block diagram of a computer system suitable for implementing an authentication augmentation system, according to some embodiments.

FIG. 2 is a block diagram of a computer system 210 suitable for implementing an authentication augmentation system 101. Both clients 103 and servers 105 can be implemented in the form of such computer systems 210. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory), an input/output (I/O) controller 218, an audio output interface 222 communicatively coupled to an external audio device such as a speaker 220, a display adapter 226 communicatively coupled to an external video output device such as a display screen 224, one or more interfaces such as Universal Serial Bus (USB) receptacles 228, serial ports 230, parallel ports (not illustrated), etc., a keyboard controller 233 communicatively coupled to a keyboard 232, a storage interface 234 communicatively coupled to at least one hard disk 244 (or other form(s) of magnetic media), a host bus adapter (HBA) interface card 235A configured to connect with a Fibre Channel (FC) network 290, an HBA interface card 235B configured to connect to a SCSI bus 239, an optical disk drive 240 configured to receive an optical disk 242, a mouse 246 (or other pointing device) coupled to the bus 212 e.g., via a USB receptacle 228, a modem 247 coupled to bus 212, e.g., via a serial port 230, and one or more wired and/or wireless network interface(s) 248 coupled, e.g., directly to bus 212.

Other components (not illustrated) may be connected in a similar manner (e.g., document scanners, digital cameras, printers, etc.). Conversely, all of the components illustrated in FIG. 2 need not be present (e.g., smartphones and tablets typically do not have optical disk drives 240, external keyboards 242 or external pointing devices 246, although various external components can be coupled to mobile computing devices via, e.g., USB receptacles 228). The various components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 244, optical disk 242) and loaded into system memory 217 and executed by the processor 214. Application programs can also be loaded into system memory 217 from a remote location (i.e., a remotely located computer system 210), for example via the network interface 248 or modem 247. In FIG. 2, the authentication augmentation system 101 is illustrated as residing in system memory 217. The workings of the authentication augmentation system 101 are explained in greater detail below in conjunction with FIG. 3.

The storage interface 234 is coupled to one or more hard disks 244 (and/or other standard storage media). The hard disk(s) 244 may be a part of computer system 210, or may be physically separate and accessed through other interface systems.

The network interface 248 and or modem 247 can be directly or indirectly communicatively coupled to a network 107 such as the Internet. Such coupling can be wired or wireless.

Figure 3:
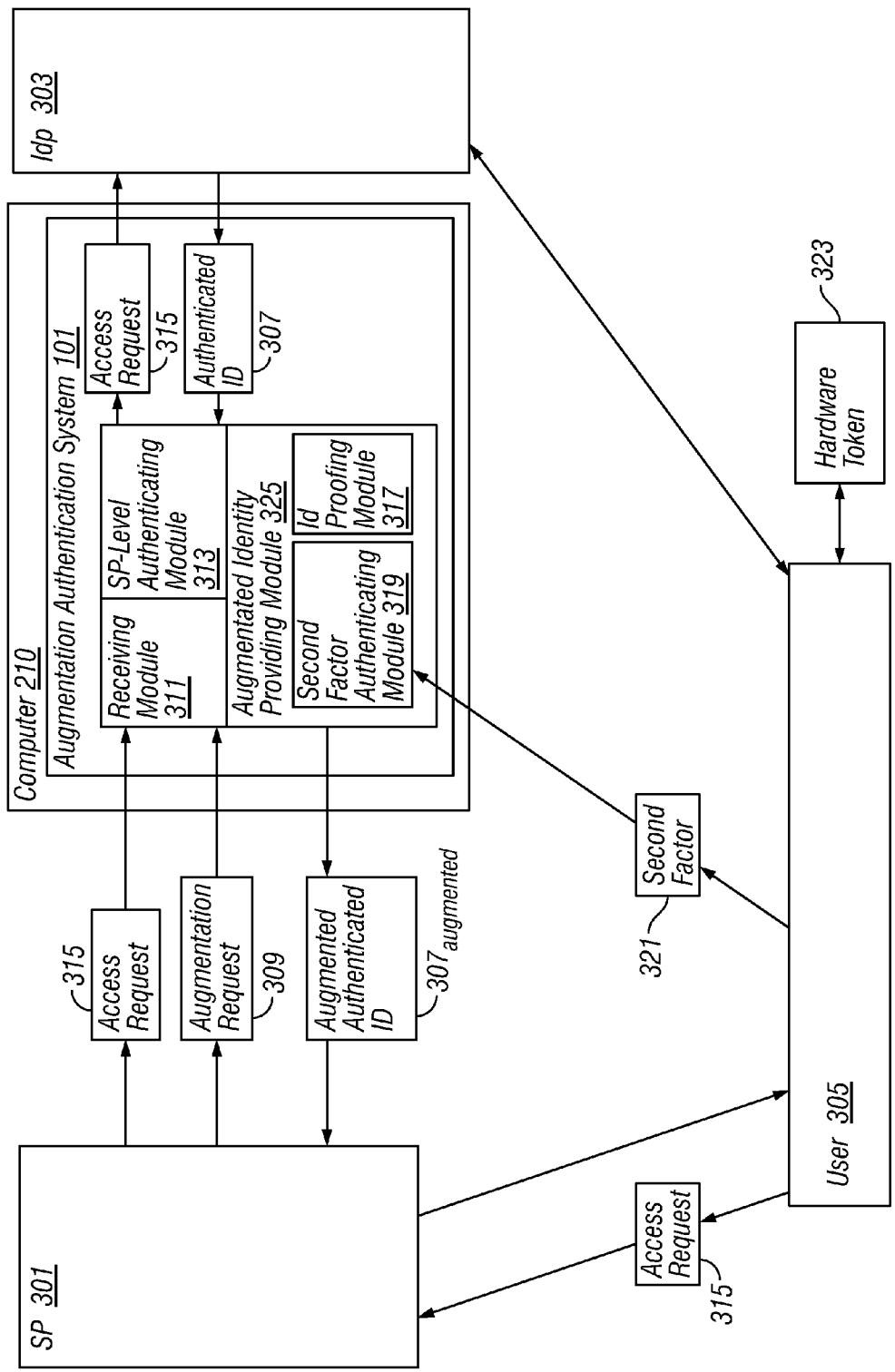
FIG. 3 is a block diagram of the operation of an authentication augmentation system, according to some embodiments.

FIG. 3 illustrates the operation of an authentication augmentation system 101, according to some embodiments. As described above, the functionalities of the authentication augmentation system 101 can reside on a client 103, a server 105, or be distributed between multiple computer systems 210, including within a cloud-based computing environment in which the functionality of the authentication augmentation system 101 is provided as a service over a network 107. It is to be understood that although the authentication augmentation system 101 is illustrated in FIG. 3 as a single entity, the illustrated authentication augmentation system 101 represents a collection of functionalities, which can be instantiated as a single or multiple modules as desired (an instantiation of specific, multiple modules of the authentication augmentation system 101 is illustrated in FIG. 3). It is to be understood that the modules of the authentication augmentation system 101 can be instantiated (for example as object code or executable images) within the system memory 217 (e.g., RAM, ROM, flash memory) of any computer system 210, such that when the processor 214 of the computer system 210 processes a module, the computer system 210 executes the associated functionality. As used herein, the terms "computer system," "computer," "client," "client computer," "server," "server computer" and "computing device" mean one or more computers configured and/or programmed to execute the described functionality. Additionally, program code to implement the functionalities of the authentication augmentation system 101 can be stored on computer-readable storage media. Any form of tangible computer readable storage medium can be used in this context, such as magnetic or optical storage media. As used herein, the term "computer readable storage medium" does not mean an electrical signal separate from an underlying physical medium.

As illustrated in FIG. 3, an authentication augmentation system 101 runs on a computer 210 (e.g., a server 105) and provides integration of strong authentication for a service provider ("SP") 301. This enables automatic augmentation of the SP's own user authentication with strong techniques such as multifactor authentication and identity proofing. Conventional mechanisms for an SP 301 to incorporate multifactor authentication and identity proofing require deep integration in the web service code. By contrast, as described below in detail, the authentication augmentation system 101 enables an SP 301 to augment its user authentication automatically, without changing the code of either the SP 301 or the IdP 303.

FIG. 3 illustrates the authentication augmentation system 101, an SP 301, and an identity provider ("IdP") 303 used by the SP 301 to authenticate users 305. FIG. 3 depicts the SP 301 and the IdP 303 as separate entities for clarity of illustration. It is to be understood that in practice many SPs 301 also act as IdPs 303, and an IdP 303 can provide services in addition to authentication. As explained in detail below, the authentication augmentation system 101 can provide augmented authentication to SPs 301 that perform their own authentication (e.g., SPs 301 that act as their own IdPs 303) as well as to SPs 301 that utilize third party IdPs 303 for authentication. Additionally, although FIG. 3 depicts only a single SP 301 and a single IdP 303 for illustrative clarity, it is to be understood that the authentication augmentation system 101 can provide augmented authentication to multiple SPs 301, using one or many separate IdPs 303 as desired.

A service provider ("SP") 301 is an online entity such as a website that provides at least one service to users 305 (e.g., a web merchant, a banking website, a social networking service, a cloud based storage service, etc.). An identity provider ("IdP") 303, sometimes called an identity service provider or identity assertion provider, is an online service or website that provides authenticated user identities 307 to SPs 301. After authenticating a user 305, the IdP 303 can provide the authenticated user identity 307 in the form of a software security token (sometimes called an identity token, an authentication token or a software token) which can identify and authenticate the user 305 to the SP 301, even across multiple sites and services provided by the SP 301 (and in some cases provided by related entities). In addition to authentication for account and data access, an SP can also utilize authenticated user identities 307 to provide specific users 305 with personalized service. Conventional industry standards such as SAML, OpenID and OAuth support authentication by and between multiple SPs 301 and IdPs 303.

Whereas some SPs 301 perform their own authentication, others outsource to external, third party IdPs 303. Also, as discussed in more detail below in conjunction with FIG. 4, some parties such as Facebook and Google provide user authentication for other SPs 301 in the context of integration with their own services (e.g., support for users 305 accessing services such as online banking through their Facebook accounts, wherein Facebook's authentication of the logged in user 305 is provided to the banking SP 301 through the authentication protocol Facebook uses).

As illustrated in FIG. 3, a user 305 operating a computer 210 (e.g., a client 103 which can but need not be in the form of a mobile computing device) attempts to access the SP 301 in a manner requiring authentication (e.g., the user 305 attempts to login to his/her account). For example, the user 305 can use a browser (not illustrated) to navigate to a login screen on the SP 301 that requests entry of authentication credentials. Responsive to the user's request 315 for authenticated access of the SP 301, the SP 301 redirects the access request 315 to the authentication augmentation system 101 (conventionally, the SP 301 would redirect to the IdP 303 that it utilizes for user 305 authentication). In order to redirect between sites, an HTTP 302 redirect (or equivalent or similar functionality) can be used. The redirect is received by the browser, and causes the browser to navigate to the target site. In the case of the redirect to the authentication augmentation system 101, the SP 301 can provide a request 309 to augment its authentication (e.g., as a parameter to the URL of the target of the HTTP redirect). Such an augmentation request 309 can indicate one or more specific authentication techniques to perform in order to augment the SP's authentication, as well as any additional parameters or directives for the augmented authentication, such as a specific second factor 321 to use, a target IdP 303, etc. In some embodiments, the augmentation request 309 does not articulate the specific level of augmented authentication to perform, but instead is a general directive to augment the service provider's user authentication, according to criteria to be determined by the authentication augmentation system 101. In such a case, the redirection of the access request 315 to the authentication augmentation system 101 can itself comprise the augmentation request 309.

A request receiving module 311 of the authentication augmentation system 101 receives the redirected access request 315 and the augmentation request 309. A server provider (SP) level authenticating module 313 of the authentication augmentation system 101 uses SAML or a similar identity management protocol to redirect the user's access request 315 to the original target IdP 303, which as noted above can be operated by the SP 301 or by a third party. The IdP 303 prompts the user 305 to enter the credentials (e.g., username, password) for the default level (e.g., password based) authentication of the user 305 for the SP 301. The user 305 enters the credentials in response to the prompt, and the IdP 303 then performs the default level authentication. The IdP 303 uses a protocol such as SAML or OpenID to redirect the user's authenticated identity 307 (e.g., indicating that the user 305 has been successfully authenticated according to the SP's default authentication for the current session) back to the authentication augmentation system 101, which redirected the access request 315 to the IdP 303 in the first place. In another embodiment, the authentication augmentation system 101 functions as the IdP 303, and performs the default level (e.g., password based) authentication for the SP 301, as opposed to redirecting same to an external IdP 303.

In response to having received the request 309 to augment the service provider's authentication of the user 305, the authentication augmentation system 101 augments the authentication with at least one strong authentication technique, such as identity proofing and/or multifactor authentication. The authentication augmentation system 101 provides the strong augmented authentication of the user 305 to the SP 301 automatically, without requiring the SP 301 or the IdP 303 to provide the augmented authentication, or to modify their code to integrate the augmented authentication. Different levels and forms of strong authentication can be used to augment the SP's default (e.g., password based) authentication in different embodiments. In some embodiments, an identity proofing module 317 of the authentication augmentation system 101 employees identity proofing of new users 305 who have not previously established their identity to the authentication augmentation system 101. In this scenario, the identity proofing module 317 requires the user 305 to prove that s/he is who s/he claims to be before being granted access to the SP 301. In different embodiments, the identity proofing module 317 can use different identity proofing methodologies in this context.

One example is out-of-band proofing, in which a channel other than the online communication session is used to contact the user 305 for the purpose of identity proofing. More specifically, the identity proofing module 317 can attempt the contact via a phone number which is on record as being that of the user 305 (this can be in the form of placing an automated call or sending a text message to the number). In other embodiments, other out-of-bound communication channels are used, such as sending an email to an address on record as belonging to the user 305. The out-of-bound communication can be used to direct the user 305 to send a reply message or make a reply phone call, to provide a onetime use code for the user 305 to enter through the in-band communication, or to take other additional actions to prove his/her identity. Although not immune to attack (e.g., a fraudster could have obtained unauthorized access to the user's phone or email), out-of-band proofing adds a substantial level of security.

Other forms of identity proofing can be used in other embodiments, such dynamic knowledge based authentication, in which the identity proofing module 317 dynamically generates a question on the fly for the user 305 to answer. The question is generated such that the answer should be known to the user 305 but typically could not by answered by a fraudster in realtime. In dynamic knowledge based authentication, rather than having the user 305 select the questions and supply the answers in advance, the questions and answers are based on information gleaned by the identity proofing module 317 from public records or a third party service. Examples of dynamically generated questions are "What was the amount of your last mortgage payment?" or "What state did you live in before you moved to your current state of residence?" Typically, a question is used only once for a user 305, and the answer is not stored. In other embodiments, static knowledge based authentication is used instead, although this is less robust than the dynamic variety.

In some embodiments, the identity proofing is only employed for unrecognized users 305, whereas in other embodiments identity proofing steps can be reapplied even to known users 305 (e.g., randomly, according to a given time period such as monthly, after a requisite period of not having logged on to the SP 301, etc.). When to use identity proofing and/or what form the identity proofing is to take can be specified to the identity proofing module 317 by the SP 301, and/or determined by the identity proofing module 317 in different embodiments.

In some embodiments, a second factor authenticating module 319 of the authentication augmentation system 101 authenticates the user 305 based on a second factor 321 in addition to the password (the first factor) provided to the IdP 303, thereby providing multifactor authentication of the user 305. More specifically, the second factor authenticating module 319 receives a second factor 321 from the user 305 (for example, in response to a prompt), and uses the second factor 321 to authenticate the user 305. Different second factors 321 can be used in different embodiments.

In some embodiments, the second factor 321 is in the form of a number (often called a passcode) generated and displayed by a hardware token 323, which has been physically provided to the user 305 through a secure channel. The hardware token 323 derives the number from a secret that is known only to itself and the second factor authenticating module 319 (a shared secret), through a cryptographic process. The secret is hashed or otherwise cryptographically combined with a dynamic challenge, resulting in the passcode which is displayed to the user 305 on a small screen on the token 323. The second factor authenticating module 319 prompts the user 305 to enter the displayed passcode. The second factor authenticating module 319 also performs the same cryptographic process based on the shared secret and challenge, resulting in the matching passcode. Thus, the second factor authenticating module 319 is able to determine whether the user 305 is in possession of the hardware token 323. Because the challenge is dynamic in nature and changes over time, the hardware token 323 typically generates a different passcode each time the user 305 is authenticated.

In other embodiments, the second factor 321 takes the form of a passcode generated by a hardware token 323 that is communicatively coupled to the user's computer 210 (via a physical connection such as USB, an audio port, a Dallas 1-wire interface, a smartcard or magnetic card reader, or wirelessly through a protocol such as Bluetooth or Near Field Communication). In the case of such connected hardware tokens 323, rather than display the passcode to the user 305 to be entered, the connected hardware token 323 provides it to the user's computer 210 directly. In some embodiments, a connected hardware token 323 is emulated through software (e.g., a virtualized or soft token).

In other embodiments, biometric data is used for the second authentication factor 321. For example, the user 305 can provide a fingerprint, voiceprint, iris scan or other biometric factor, which the second factor authenticating module 319 matches against stored valid biometric data concerning the user 305. Yet other second factors 321 are utilized in other embodiments, and some embodiments require more than two authentication factors (e.g., password, hardware token 323 generated passcode and fingerprint). How many and which specific authentication factors to use can be specified by the SP 301 to the second factor authenticating module 319, and/or determined by the second factor authenticating module 319.

It is to be understood that in different embodiments, the authentication augmentation system 101 can also or instead augment the SP 301 authentication with different authentication techniques and or combinations thereof, according to directives from the SP 301 and/or by default. In any case, in response to successfully authenticating the user 305 according to whatever augmented authentication the specific embodiment utilizes, an augmented identity providing module 325 of the authentication augmentation system 101 redirects an augmented authenticated identity $307_{augmented}$ for the user 305 back to the SP 301. The augmented authenticated identity $307_{augmented}$ consists of the authenticated identity 307 which indicates that the user 305 has been successfully authenticated by the IdP 303 according to the default authentication of the SP 301, plus an indication that the user 305 has been successfully authenticated according to the augmented authentication. Because this augmented authenticated identity $307_{augmented}$ results from the strong authentication automatically provided by the authentication augmentation system 101, it enables the SP 301 to provide strong authentication (e.g., multifactor authentication with identity proofing) of its users 305, without having to implement or integrate these techniques itself.

Figure 4:
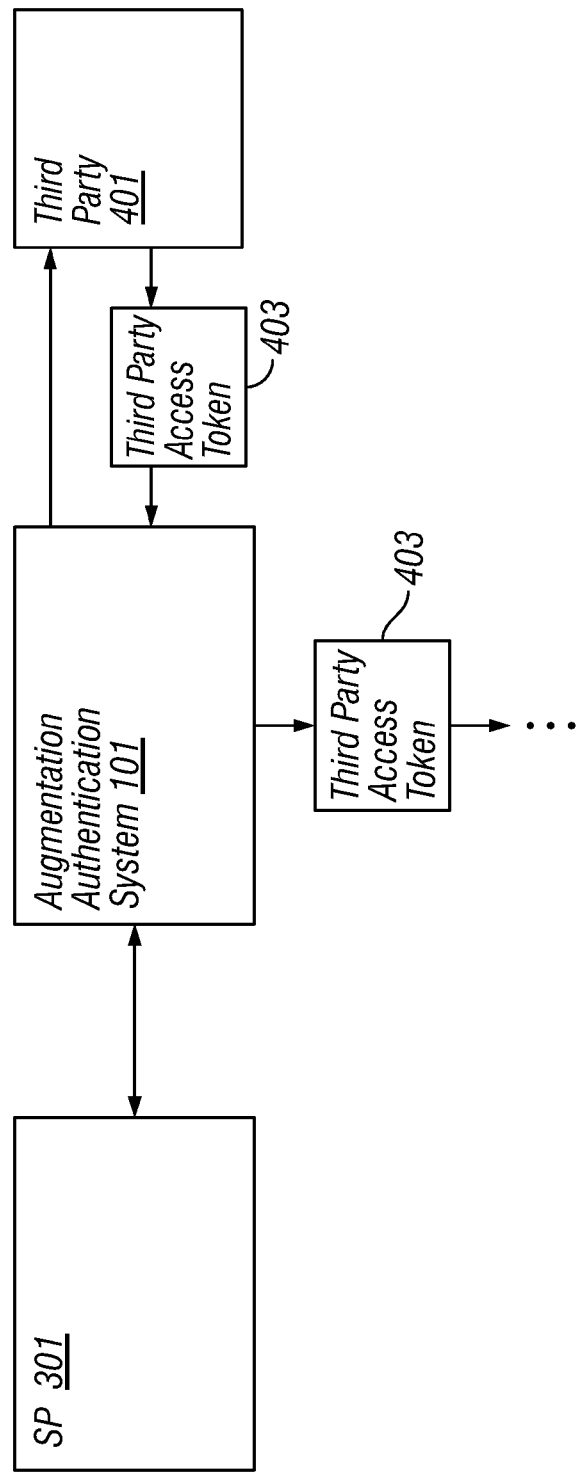
FIG. 4 is a block diagram of the operation of an authentication augmentation system, according to other embodiments.

FIG. 4 illustrates an embodiment in which the authentication augmentation system 101 augments user authentication that is performed by a third party 401 and extended to the SP 301, without the SP 301 entering into a specific partnership or arrangement with the third party 401. In the embodiment illustrated in FIG. 4, the third party 401 provides both services and authenticated identities to its own users 305, and supports extending its own authentication to allow its users 305 to authenticate to other SPs 301. More specifically, it is becoming increasingly common for certain enterprises such as social networking and other online service providers (e.g., Facebook, Google, etc.) to support the extension of their own user authentication to other SPs 301. For example, using this functionality, Facebook allows other SPs 301 to authenticate users 305 through Facebook's authentication, by utilizing their Facebook accounts. To illustrate, an SP 301 such as a banking service provider can allow a user 305 to login to its own website using a Facebook account. Instead of the user logging in to the bank's website via the bank's login screen, the user 305 selects an option to login to the bank via Facebook. The bank's website then redirects the access request 315 to Facebook using Facebook's authentication protocol (currently OAuth), which prompts the user to login to his/her Facebook account (unless the user 305 is already logged in). Using its own (password based) authentication, Facebook identifies the user 305 and redirects the authenticated identity 307 back to the banking website. Many SPs 301 wish to integrate with Facebook, Google and other popular third party sites 401, but doing so conventionally requires that the SP 301 accept the user authentication that the third party site 401 provides, which is typically password based and hence relatively weak.

As illustrated in FIG. 4, the authentication augmentation system 101 can automatically augment the third party site's authentication. In a process similar to the one described above in conjunction with FIG. 3, a user 305 attempts to access the SP 301 by authenticating through the third party 401. In the example illustrate in FIG. 4 the SP 301 is the banking website and the third party 401 is Facebook. The banking SP 301 redirects the access request 315 to the authentication augmentation system 101 (conventionally, the SP 301 would redirect to the third party 401). The SP 301 can specify the desired authentication to the authentication augmentation system 101 with a specific augmentation request 309 as described above (e.g., as a parameter to the URL of the target of the HTTP redirect). For example, in the embodiment illustrated in FIG. 4, the augmentation request 309 could specify to authenticate through Facebook and to perform a specific level of augmentation, such as identity proofing and a second factor 321.

The request receiving module 311 of the authentication augmentation system 101 receives the redirected access request 315 and the augmentation request 309, and the SP-level authenticating module 313 of the authentication augmentation system 101 uses OAuth (or whatever protocol is used by the third party 401) to redirect the user's access request 315 to Facebook 401. Facebook performs its password based authentication of the user 305, who may already be logged in to Facebook or if not will be prompted to login. Facebook 401 uses OAuth to redirect the authenticated user identity 307 (in the case of Facebook, this is in the form of a Facebook user access token 403 which is discussed below) back to the authentication augmentation system 101. The authentication augmentation system 101 proceeds to augment the authentication to automatically provide strong authentication of the user 305 for the banking SP 301, using, for example, identity proofing and multifactor authentication as described above in conjunction with FIG. 3. Different levels and forms of augmenting strong authentication can be applied in different embodiments.

The augmented identity providing module 325 of the authentication augmentation system 101 redirects the augmented authenticated identity $307_{augmented}$ for the user 305 back to the banking SP 301. Typically in this type of third party scenario, the augmented authenticated identity $307_{augmented}$ includes the authenticated user identity 307 for use by the SP 301, but also indicates that the augmented authentication has been performed. Thus, the authentication augmentation system 101 enables the SP 301 to integrate with third parties 401 such as Facebook, without having to rely on, e.g., Facebook's authentication. By augmenting the authentication as desired, the authentication augmentation system 101 can avoid any vulnerabilities in the third party's authentication. For example, the use of identity proofing can protect the SP 301 against the use of fake (e.g., largely empty or blatantly falsified) Facebook profiles.

Note that in the case of Facebook and other third party sites 401 that support the type of third party authentication described above, the authenticated user identity 307 provided by the third party 401 typically is in the form of a third party session id (e.g., a Facebook user access token 403). This allows the SP 301 that authenticated its user 305 through the third party 401 to utilize certain services provided by the third party 401, on behalf of the user 305. For example, a Facebook user access token 403 is a random string that identifies a user 305, and provides information about granted permissions. It also includes an indication of when the token 403 will expire. Because of privacy checks, the majority of API calls on Facebook need to be signed with the user access token 403 (e.g., calls to the API to read, modify or write the user's Facebook data such as profile, photos, etc.). The user access token 403 is in effect a limited and time bound permission that can be used on behalf of the user 305. Thus, the SP 301 (e.g., the banking service provider) can use the access token 403 to call certain Facebook services on behalf of the user 305 during the session.

In some embodiments, the authentication augmentation system 101 uses the third party specific session id (e.g., the Facebook user access token 403) to call third party services itself on behalf of the user 305 to further automatically integrate with the third party 401. The authentication augmentation system 101 can also share the third party specific session id with other entities for this purpose as desired.

Figure 5:
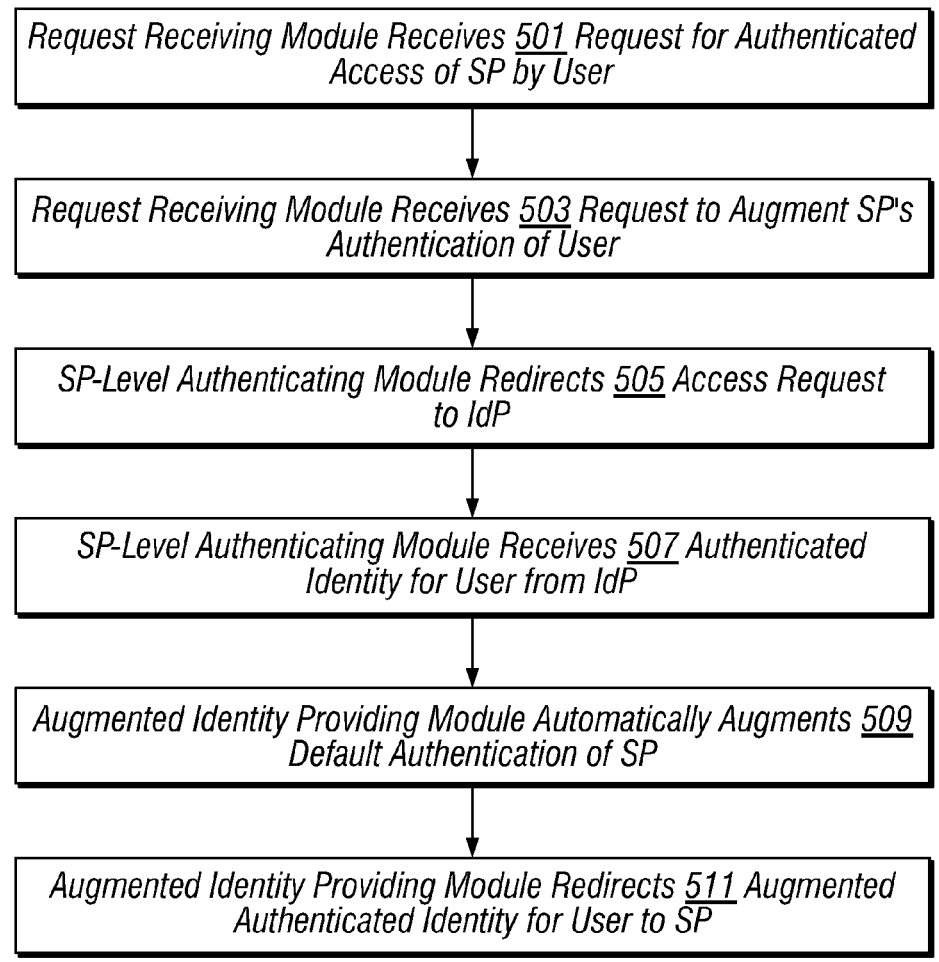
FIG. 5 is a flowchart of the operation of an authentication augmentation system, according to some embodiments.

FIG. 5 illustrates steps of the operation of an authentication augmentation system 101, according to some embodiments. The request receiving module 311 receives 501 a request for authenticated access 315 of the SP 301, which was made by the user 305 to the SP 301 and redirected to the authentication augmentation system 101. The request receiving module 311 also receives 503 a request 309 to augment the SP's authentication of the user 305, from the SP 301. The SP-level authenticating module 313 redirects 505 the request for authenticated access 309 to an IdP 303, and receives back 507 an authenticated identity 307 for the user 305, from the IdP 303 (the received authenticated identity 307 for the user 305 indicates that the user 305 has been successfully authenticated by the IdP 303 according to a default authentication of the SP 301).

In response to the received request 309 to augment the SP's authentication of the user 305, the augmented identity providing module 325 automatically augments 509 the default authentication of the SP 301 with at least one additional authentication technique, without the SP 301 or the IdP 303 modifying their code to implement or integrate the at least one additional authentication technique. The augmented identity providing module 325 redirects 511 an augmented authenticated identity $307_{augmented}$ for the user 305 to the SP 301 (the augmented authenticated identity $307_{augmented}$ comprises the authenticated identity 307 for the user 305 which indicates that the user 305 has been successfully authenticated by the IdP 303 according to the default authentication of the SP 301, and further comprising an indication that the user 305 has been successfully authenticated according to the at least one additional authentication technique).

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer-implemented method for automatically augmenting a service provider's authentication of a user, the method comprising the steps of:

receiving a request for authenticated access, by a computer implemented authentication augmentation system, the received request for authenticated access having been made by the user to the service provider, and having been redirected from the service provider to the authentication augmentation system;

receiving a request to augment the service provider's authentication of the user, by the authentication augmentation system from the service provider responsive to the service provider's authentication relying upon a third party site's authentication and the service provider's authentication being relatively weaker than the third party site's authentication;

redirecting the request for authenticated access to an identity provider, by the authentication augmentation system;

the authentication augmentation system receiving an authenticated identity for the user from the third party, the authenticated identity comprising a third party session id concerning the user, the received authenticated identity for the user indicating that the user has been successfully authenticated by the identity provider according to a default authentication of the service provider;

responsive to the received request to augment the service provider's authentication of the user, automatically augmenting the default authentication of the service provider with at least one additional authentication technique, by the authentication augmentation system, without the service provider or the identity provider modifying its code to implement or integrate the at least one additional authentication technique, comprising automatically augmenting, by the authentication augmentation system, user authentication that is performed by a third party and extended to the service provider, without the service provider entering into a specific partnership with the third party, wherein the third party provides both services and authenticated user identities; and responsive to successfully authenticating the user according to the at least one additional authentication technique, the authentication augmentation system, instead of any other entity, using the received third party session id to access services provided by the third party, on behalf of the user;

redirecting an augmented authenticated identity for the user, by the authentication augmentation system to the service provider, the augmented authenticated identity comprising the authenticated identity for the user indicating that the user has been successfully authenticated by the identity provider according to the default authentication of the service provider, and further comprising an indication that the user has been successfully authenticated according to the at least one additional authentication technique.

2. The method of claim 1 wherein receiving a request to augment the service provider's authentication of the user, by the authentication augmentation system from the service provider, further comprises:

receiving a request directing the authentication augmentation system to augment the service provider's authentication of the user by providing at least one specific additional authentication technique.

3. The method of claim 1 wherein receiving a request to augment the service provider's authentication of the user, by the authentication augmentation system from the service provider, further comprises:

receiving a general directive to augment the service provider's authentication of the user according to authentication augmentation system determined criteria.

4. The method of claim 1 wherein automatically augmenting the default authentication of the service provider with at least one additional authentication technique further comprises:
   providing identity proofing of the user, by the authentication augmentation system, thereby automatically augmenting the default authentication of the service provider.

5. The method of claim 4 wherein providing identity proofing of the user further comprises:
   using a communication channel other than a current online communication session, by the authentication augmentation system, in order to prove the user's identity.

6. The method of claim 4 wherein providing identity proofing of the user further comprises:
   dynamically generating a question on the fly for the user to answer and thereby proving the user's identity, by the authentication augmentation system.

7. The method of claim 4 wherein providing identity proofing of the user further comprises:
   employing identity proofing of the user only in response to the user's identity not having been previously proven to the authentication augmentation system.

8. The method of claim 1 wherein automatically augmenting the default authentication of the service provider with at least one additional authentication technique further comprises:
   providing multifactor authentication of the user, by the authentication augmentation system, by authenticating the user based on at least a second factor in addition to a password.

9. The method of claim 8 wherein authenticating the user based on at least a second factor in addition to a password further comprises:
   authenticating the user based on a passcode generated by hardware token.

10. The method of claim 8 wherein authenticating the user based on at least a second factor in addition to a password further comprises:
    authenticating the user based on a biometric factor.

11. The method of claim 8 wherein authenticating the user based on at least a second factor in addition to a password further comprises:
    authenticating the user based on multiple factors in addition to the password.

12. The method of claim 1 wherein redirecting the request for authenticated access to an identity provider further comprises:
    redirecting the request for authenticated access to an identity provider operated by a party from a group of parties consisting of: the service provider, the authentication augmentation system and a third party.

13. The method of claim 1 further comprising:
    using, by the authentication augmentation system, an identity management protocol utilized by the third party to communicate with the third party concerning authentication of the user.

14. The method of claim 1 wherein the default authentication of the service provider further comprises:
    single factor password based authentication.

15. The method of claim 1 further comprising:
    the authentication augmentation system using Security Assertion Markup Language ("SAML") to communicate with the service provider and the identity provider concerning authentication of the user.

16. At least one non-transitory computer readable-storage medium for automatically augmenting a service provider's authentication of a user, the at least one non-transitory computer readable-storage medium storing computer executable instructions that, when loaded into computer memory and executed by at least one processor of a computing device, cause the computing device to perform the following steps:
    receiving a request for authenticated access, by a computer implemented authentication augmentation system, the received request for authenticated access having been made by the user to the service provider, and having been redirected from the service provider to the authentication augmentation system;
    receiving a request to augment the service provider's authentication of the user, by the authentication augmentation system from the service provider responsive to the service provider's authentication relying upon a third party site's authentication and the service provider's authentication being relatively weaker than the third party site's authentication;
    redirecting the request for authenticated access to an identity provider, by the authentication augmentation system;
    the authentication augmentation system receiving an authenticated identity for the user from the third party, the authenticated identity comprising a third party session id concerning the user, by the authentication augmentation system, the received authenticated identity for the user indicating that the user has been successfully authenticated by the identity provider according to a default authentication of the service provider;
    responsive to the received request to augment the service provider's authentication of the user, automatically augmenting the default authentication of the service provider with at least one additional authentication technique, by the authentication augmentation system, without the service provider or the identity provider modifying its code to implement or integrate the at least one additional authentication technique, comprising automatically augmenting, by the authentication augmentation system, user authentication that is performed by a third party and extended to the service provider, without the service provider entering into a specific partnership with the third party, wherein the third party provides both services and authenticated user identities; and
    responsive to successfully authenticating the user according to the at least one additional authentication technique, the authentication augmentation system, instead of any other entity, using the received third party session id to access services provided by the third party, on behalf of the user;
    redirecting an augmented authenticated identity for the user, by the authentication augmentation system to the service provider, the augmented authenticated identity comprising the authenticated identity for the user indicating that the user has been successfully authenticated by the identity provider according to the default authentication of the service provider, and further comprising an indication that the user has been successfully authenticated according to the at least one additional authentication technique.

17. A computer authentication augmentation system for automatically augmenting a service provider's authentication of a user, the computer authentication augmentation system comprising:
    at least one processor;
    system memory;

a request receiving module residing in the system memory, the request receiving module being programmed to receive a request for authenticated access, the received request for authenticated access having been made by the user to the service provider, and having been redirected from the service provider to the authentication augmentation system, the request receiving module being further programmed to receive a request to augment the service provider's authentication of the user, from the service provider responsive to the service provider's authentication relying upon a third party site's authentication and the service provider's authentication being relatively weaker than the third party site's authentication;

a service provider level authenticating module residing in the system memory, the service provider level authenticating module being programmed to redirect the request for authenticated access to an identity provider, the service provider level authenticating module being further programmed to receive an authenticated identity for the user, from the identity provider, the received authenticated identity for the user indicating that the user has been successfully authenticated by the identity provider according to a default authentication of the service provider;

an augmented identity providing module residing in the system memory, the augmented identity providing module being programmed to automatically augment the default authentication of the service provider with at least one additional authentication technique, without the service provider or the identity provider modifying its code to implement or integrate the at least one additional authentication technique, comprising automatically augmenting, by the authentication augmentation system, user authentication that is performed by a third party and extended to the service provider, without the service provider entering into a specific partnership with the third party, wherein the third party provides both services and authenticated user identities, the augmented identity providing module being further programmed for receiving by the authentication augmentation system an authenticated identity for the user from the third party, the authenticated identity comprising a third party session id concerning the user; wherein the authentication augmentation system, instead of any other entity, uses the received third party session id to access services provided by the third party, on behalf of the user;

the augmented identity providing module being further programmed to redirect an augmented authenticated identity for the user to the service provider, the augmented authenticated identity comprising the authenticated identity for the user indicating that the user has been successfully authenticated by the identity provider according to the default authentication of the service provider, and further comprising an indication that the user has been successfully authenticated according to the at least one additional authentication technique.

* * * * *